A. T. Serrell,

Wood Molding Machine,

No. 243, Reissued June 21, 1853.

Witnesses;
Geo. G. Siedle
W. P. N. Hotchkiss

Inventor;
Alfred T. Serrell

A.M. PHOTO-LITHO. CO. N.Y. (OSBORNE'S PROCESS)

UNITED STATES PATENT OFFICE.

ALFRED T. SERRELL, OF NEW YORK, N. Y.

IMPROVEMENT IN MACHINERY FOR MAKING MOLDINGS.

Specification forming part of Letters Patent No. 5,575, dated May 16, 1848; Reissue No. 187, dated January 7, 1851; Reissue No. 243, dated June 21, 1853.

*To all whom it may concern:*

Be it known that I, ALFRED T. SERRELL, of the city and county of New York, have invented a new and useful Improvement in Machinery for Making a Wood Molding which may be Applied to every Change of Pattern, for which Letters Patent were granted to me on the 16th day of May, 1848, were afterward surrendered and canceled, and new and amended Letters Patent were reissued to me upon an amended specification on the 7th day of January, 1851, and the said reissued Letters Patent have been surrended for the purpose of describing the said invention, and pointing out in what it consists in more full, clear, and exact terms than was done in the said reissue aforesaid.

Figure 2:
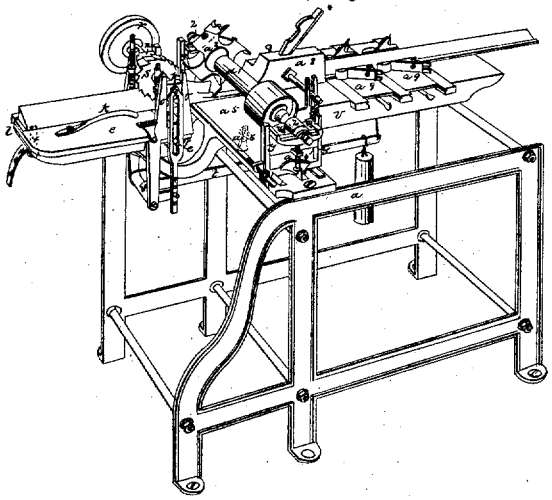
Figure 8:
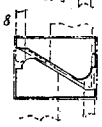
Figure 11:
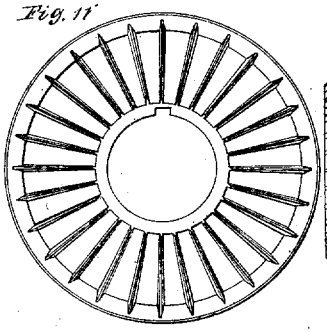
Figure 12:
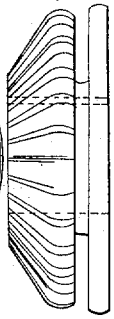
Figure 1:
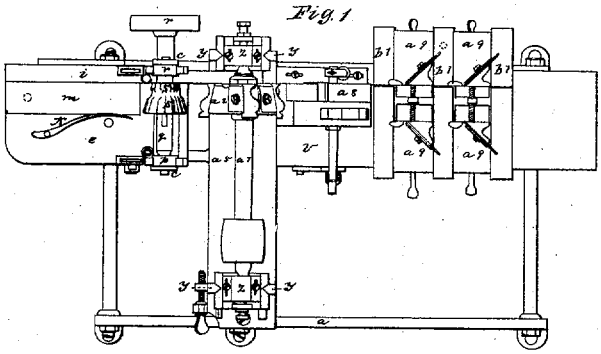
Figure 9:
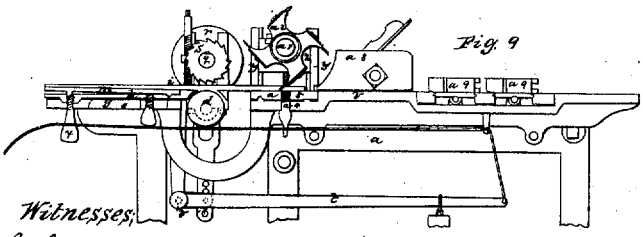
Figure 10:
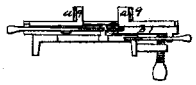

The annexed drawings show in Figure 1 a plan of the machine; in Fig. 2, a perspective view of the same. Figs. 3, 4, 5, 6, 7, and 8 show sections of the material. Fig. 9 is a vertical section of the machine through the center of Fig. 1. Fig. 10 is a cross-section showing the hinged platform, the planes, the regulating-screws, and the adaptation to different widths of material to dress each or either edge. Figs. 11 and 12 show a front view, and also a side view of a double ring.

The references are the same on the several figures.

The material or strip is not prepared upon the machine. It is to be sawed previously as nearly as possible to the shape of the required molding, keeping in view the saving of material. The red lines upon Figs. 3, 4, 5, 6, 7, and 8 show the shape in which the strip is left by the saw for the several patterns so marked, and are sufficient to show how the material may be economized. The blue lines upon the same figures show the operation of the rings, hereinafter described, upon the strip. The black lines show the shape of the molding.

The letter *a* is a frame arranged to support a bed, *b*. The frame may be in one or more parts, to accommodate a friction-roller, *d*, the bearings for which are at *c c*. The friction-roller is elevated not less than one-sixteenth of an inch above the bed *b*, to overcome the friction of the strip.

*e* is an extra bed arranged by a sheer, *g*, and slide *h* upon *b*, to move to or from the circular cutter, and is secured in place by a screw upon the under side of the bed, which is shown on Fig. 9. The extra bed *e* carries the shaft upon which the rings, hereinafter described, are keyed or fastened, and also the screws which adjust the rings; also, the standards and boxes and the friction-roller. The backward and forward movement of the extra bed allows for any variations in the length of the cutters, and also in the diameter of the rings. A fence, *i*, is a guide for the strip. A spring, *k*, keeps the strip to the fence. The extra bed has an opening in which is placed a plate, *m*, provided with a screw to elevate the end next to the workman.

*o o* are standards supporting sliding boxes *p p*, to receive the journals of a shaft, *q*, upon one end of which is a pulley, *r*.

The letter *s* shows the rings in place upon the shaft. Each ring may be made at any angle or of any number of angles, and may be either serrated or plain. The serrated rings act upon the several parts of the strip from which the greatest cutting is required, being so constructed and arranged as to avoid crushing or bruising the other parts which remain. The shape, the width, and the diameter of the rings will vary according to the pattern of molding required. The rings are either to be keyed to the shaft or secured in any way which will be convenient to the constructer to keep each ring in place, the ring or rings being set to the proper thickness by the set-screws connected with the sliding boxes *p p*, each of the set-screws resting on the bed.

Figure 5:
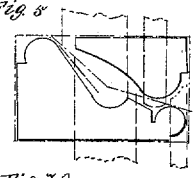
Figure 6:
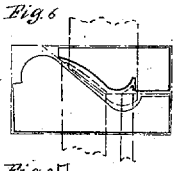
Figure 7:
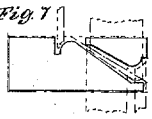

By referring to Fig. 5 it will be seen that the ring is double and corresponds with Figs. 11 and 12. The blue lines show the rings. A lever, *t*, having a fulcrum, *v*, supported by the extra bed, permits the shaft *q* to be raised. The lever, however, may be entirely dispensed with, and the sliding boxes *p p* set by screws to any required thickness. The standards *y y* are similar to the standards upon the sliding bed, and the boxes *z z* rise and fall. The journals of the shaft *a'* rest in the boxes *z z*, and the shaft *a'* carries the cutter-nut $a^2$, having four cutters, which are each to be secured upon the cutter-nut by a screw or in any way which will permit the cutters to be changed. The boxes *z z* rise and fall by set-screws $a^4$. The bed $a^5$, which supports the standards *y y*, is adjustable laterally by a screw, $a^6$, and a sheer and slide, like $g$ and $h$, and kept in place by a screw upon the underside. (Not shown.) Beyond the cutter-nut, if required, is a common molding-plane, $a^8$, under which the strip passes, and the iron corresponding to the pattern upon the circular cutter is set to take off a shaving and give an extra finish to the molding, removing that appearance called a "woolly face." The molding-plane, if required to be used, may be secured to the bed by screws or in any suitable way which will hold it in an unyielding position. After the strip has passed the molding-plane, if it be desirable to dress each or either edge, one or more planes, $a^9$, may be secured to a hinged platform, $b'$, forming part of the bed, the hinges permitting the planes to be set by means of screws, either at a right angle to the plane of the bed or at any angle. Additional sets of planes may be added, either upon the same platform or upon an extra platform arranged in a like way. It will be evident to a constructer that the planes must be arranged to dress the edge or edges of any width of molding, and that one of each set will be so arranged as to accommodate any width by a lateral movement, which is shown on Fig. 10. The shaft which carries the rings may be driven at a speed of not less than thirty revolutions in a minute, and the shaft carrying the cutters at a speed not less than three thousand revolutions in a minute, which I have found to work well when the material was white pine. It will be evident that if hard wood be used the speed will be changed to correspond with the hardness of the material. This change can be effected by reducing or increasing the diameter of the pulleys which drive the rings and cutter-nut.

To operate the machine the strip sawed to the required angle or angles is to be laid upon the plate $m$, which may be elevated above the bed by the set-screw upon the under side of the frame, and pushed forward to the rings, which, when serrated, score and forward the strip, the elevations producing a spring in the strip, which keeps it close to the bed beyond the friction-roller; or if the rings be made without being serrated, the shape nevertheless corresponding to the sawed strip, the rings acting against the elevations of the strip will keep it steady, and the spring of the strip will keep it close to the bed while operated upon by the circular cutter, which gives form to the molding. I prefer the serrated rings. It is to be recollected that as the strip is to be sawed as nearly as may be to the shape of the required molding to economize material, the rings should correspond with the number of members in the molding, the saw preparing the strip, as shown, and the rings operating only upon the parts to be removed by the circular cutter keep the under side of the strip in contact with the bed of the machine. The fence $i$ and the spring $k$ aid to keep the strip steady while operated upon by the circular cutter. If the molding do not require an extra finish, it is ready for use. If an extra finish be required, add the common molding-plane, as described, which will take off a shaving the whole length of the strip. If one or both edges of the strip require to be dressed either at a right angle to the plane of the bed or at any angle, add one or more sets of hinged planes, as described.

Figure 3:
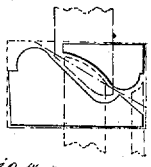
Figure 4:
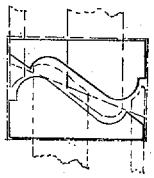

Fig. 3 shows a saving of about one-third in preparing the strip; Figs. 4 and 8, a saving of one-half.

In the machine as shown and described the circular cutter is operating against the motion of the material; but I have found that in practice the work is performed by operating the material in the same way as the motion of the circular cutter, the several parts of the machine being arranged to correspond with the change in the motion of the circular cutter.

My invention is not limited to any form of ring or any form of circular cutter. On the contrary, the patterns of each may vary, and be changed into as many combinations as the letters of the alphabet in spelling words.

Having described my machine and shown the manner of its operation, I will point out and explain some of its points of difference from any other machine.

I am well aware of the ordinary cylindrical feed-rollers commonly used on the Emmons machine, the Woodworth machine, and others; but such rollers are not capable of feeding the material worked in my machine. By observing the upper surface of the strip to be dressed it will be seen that such rollers could only touch one or at most two of the higher edges thereof, and therefore could not take the proper hold to feed the material unless pressure were applied so great as to mar and abrade those parts from which nothing is to be removed by the cutters except what is barely sufficient to dress them into form. This roller, therefore, is inadmissible and cannot be used in my machine. Inclined rollers have sometimes been attempted; but they present the same objections in even a worse degree. On my machine the Emmons or the Woodworth feed-rollers would become inclined. Conical rollers have also been essayed, sometimes armed with pins; but these, unless made of the precise section of the surface to be operated upon, would present the same objection, and when armed with pins would otherwise further injure the parts intended to be retained, and if rollers were made to fit each form to be given by the saws and each size their name would be legion; but even if a full assortment of such rollers were procured, then they would operate badly. All the different parts of these rollers would have different diameters and circumferences. Each circle of the roller would strive to feed the piece at a speed due to its own circumferential motion, all of which would be different, so that the piece could move with a speed equal to the circumferential motion of only one section of the roller, while at all other parts the piece would move faster or slower than the parts of the roller in contact with it, thus producing immense friction, waste of power, irregularity of motion, tendency to throw the piece out of line, &c., without any redeeming advantage.

It will be readily seen that to a great degree I remedy all these evils and inconveniences by fixing one or two rings on the feed-shaft, capable of being moved endwise on it and of being fixed at the desired point, or of being removed and supplanted by another. The ring or rings referred to is or are fixed in such position as to fall and act upon a part of the strip from which a large quantity of the wood is to be removed, and is allowed to take a rank hold of the surplus wood, so as to be capable of feeding without touching a wide surface or in any manner marring the parts from which little is to be removed. I prefer to serrate the edges of the ring or rings in all cases, because I thereby score the strip and make the whole operation much easier and the work more perfect, but principally because the serrated ring will take a much better hold of the wood for feeding, and can be thinner, which is often of much importance. The surface upon which the ring may be applied is sometimes, however, sufficiently wide to allow a plain ring to be used with but little disadvantage. Some forms of molding will allow the use of two rings, of substantially equal diameters, at some distance apart, in which case I use them; but generally I feed with one ring, and other serrated rings, if used, being of a different circumference, cannot aid in feeding, but merely score. The edges of the rings may be of any convenient form; but I usually make them to approximate the converse of that part of the molding over which they are to pass, for the more perfect scoring of the part to be removed, and to avoid abrasion deeper than is advantageous. Thus my mode of feeding differs widely from the use of ordinary feed-rollers and much resembles feeding by a rack and pinion. When I use a feeding-ring the edge of which is conical, or nearly so, the part which takes the firmest hold does the feeding, while the other parts do little but score. It will therefore readily be seen that I have not adopted the ring or disk taking rank hold of the surplus wood as a feeding-instrument on my machine, for the purpose of making a fanciful change in feeding apparatus, but because such apparatus as has previously been used or known would not answer the purpose where the material is sawed into such forms as economy suggests. Such a roller as will feed a plank or board to be dressed will not feed an angular strip to make a molding, and my invention will not properly feed a plank or board. The rank hold taken by the ring would mar the board its whole length, whereas on the molding-strip the ring may take a rank hold of the wood to be removed without injury and with positive advantage; neither can my ring perform any of the duties peculiar to the Woodworth pressure-roller, except when so weighted as to yield, nor does the work to be done require that duty. If the ring be applied to planing a plank or board, it is perfectly obvious that it could not in consequence of the thinness of its edge properly hold the piece down, and if a plank or board should be warped or winding, it is obvious that it could not, for the same reason, take out the warps or present the plank or board flat to the cutters; but the angular strip upon which I operate has neither a warp nor a wind, such pieces being rejected, and the tendency of the parts to bend upward is in a great degree counteracted by the thickness of the strip in comparison with its width, and if there were any warps these proportions would render it impossible to take them out. Again, the uniform thickness given to the strip on a given line from end to end renders it unnecessary to use the ring on a yielding shaft, and I make the weight so heavy as to prevent yielding, and I use a weighted shaft and set-screws only as a convenient mode of adjustment, and of opening up the machine, and the shaft is not intended to yield during the operation of dressing any one strip, but is simply adjusted to the thicknesses of different moldings by the set-screw, and is not self-adapting. If not thus adjusted, but left, like pressure and feed rollers, to adjust itself by means of springs or weights, the rings would often sink too deeply into the strip and ruin the molding, or take too light a hold. It is obvious that the strip might be fed by yielding rings; but the yielding feature would be of no advantage, but objectionable. I much prefer to make my rings unyielding by the use of a heavy weight, or by other convenient means. The strip, when put into the machine, is substantially uniform in thickness from end to end, and the thickness of the shaving is regulated by the adjustment. It is well known that prior to the invention of the Woodworth machine pressure bars and rollers were used in close proximity with the cutters, which would hold down a board or piece while the cutter took off a shaving of a given thickness, and thus the board was dressed well if of uniform thickness before being planed; but the peculiarity claimed for the Woodworth pressure-roller is that while holding down the board it will yield to its inequalities or adapt itself to boards or planks differing from each other in thickness; but there is no demand for such service in dressing moldings on my plan. I prefer my rings to work on the old plan, on strips substantially of uniform thickness on any line from end to end, and such strips I usually operate upon. If slight differences of thickness exist, it is preferable that the rings should not rise, but score deeper into the strip; and when moldings differing from each other in thickness are to succeed each other in my machine, a different adjustment is required. In the Woodworth machine the whole pressure of the roller, with its springs or weights, comes upon the board or plank at a variable distance from the bed, and the work cannot otherwise be done; but in my machine the shaft and the ring or rings should rest upon the set-screws principally and constantly at a fixed distance from the bed; otherwise the molding might be spoiled by the indentations of the ring or rings. Thus it appears by the foregoing explanation that none of the duties peculiar to the Emmons or to the Woodworth combination of pressure-rollers and cutters are necessary in my machine, nor would be advantageously applicable to my mode of dressing a molding. Yielding and fixed pressure and feed rollers in combination with rotary and fixed cutters are old. These I do not claim; but, Having fully described my invention and the several modes of its operation, what I claim as new, and desire to secure by Letters Patent, is—

1. The combination of the ring or rings with a cutter or cutters for operating on an angular strip for making a molding, whether the said cutter or cutters be rotating or stationary, or both, and whether the said cutter or cutters operate on the face or on the edge of the strip, or on both the face and the edge, substantially as herein described.

2. The combination of the adjustable bed with the ring or rings and a cutter or cutters, as aforesaid, for operating on an angular strip for making a molding, whether the cutter or cutters be rotating or stationary, or both, and whether the said cutter or cutters operate on the face or on the edge of the strip, or on both the face and the edge, substantially as described.

New York, February 22, 1853.

ALFRED T. SERRELL.

Witnesses:

GEO. G. NICKLES,

W. P. N. FITZGERALD.